Oct. 3, 1944.　　　M. KATCHER　　　2,359,364
BEARING
Filed July 1, 1941　　　2 Sheets-Sheet 1
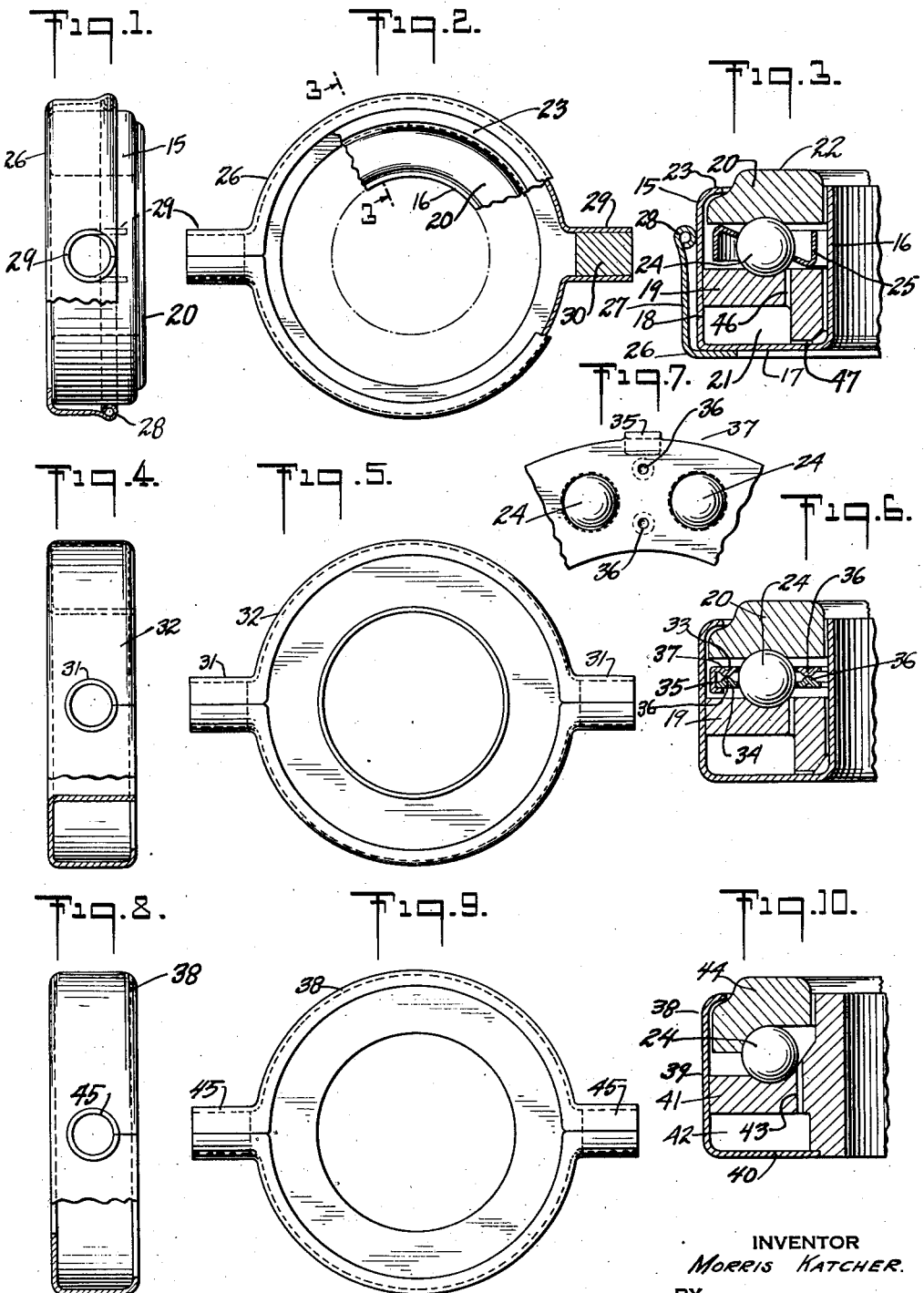
INVENTOR
MORRIS KATCHER.
BY
Emanuel Scheyer
ATTORNEY Oct. 3, 1944.　　　M. KATCHER　　　2,359,364
BEARING
Filed July 1, 1941　　　2 Sheets-Sheet 2
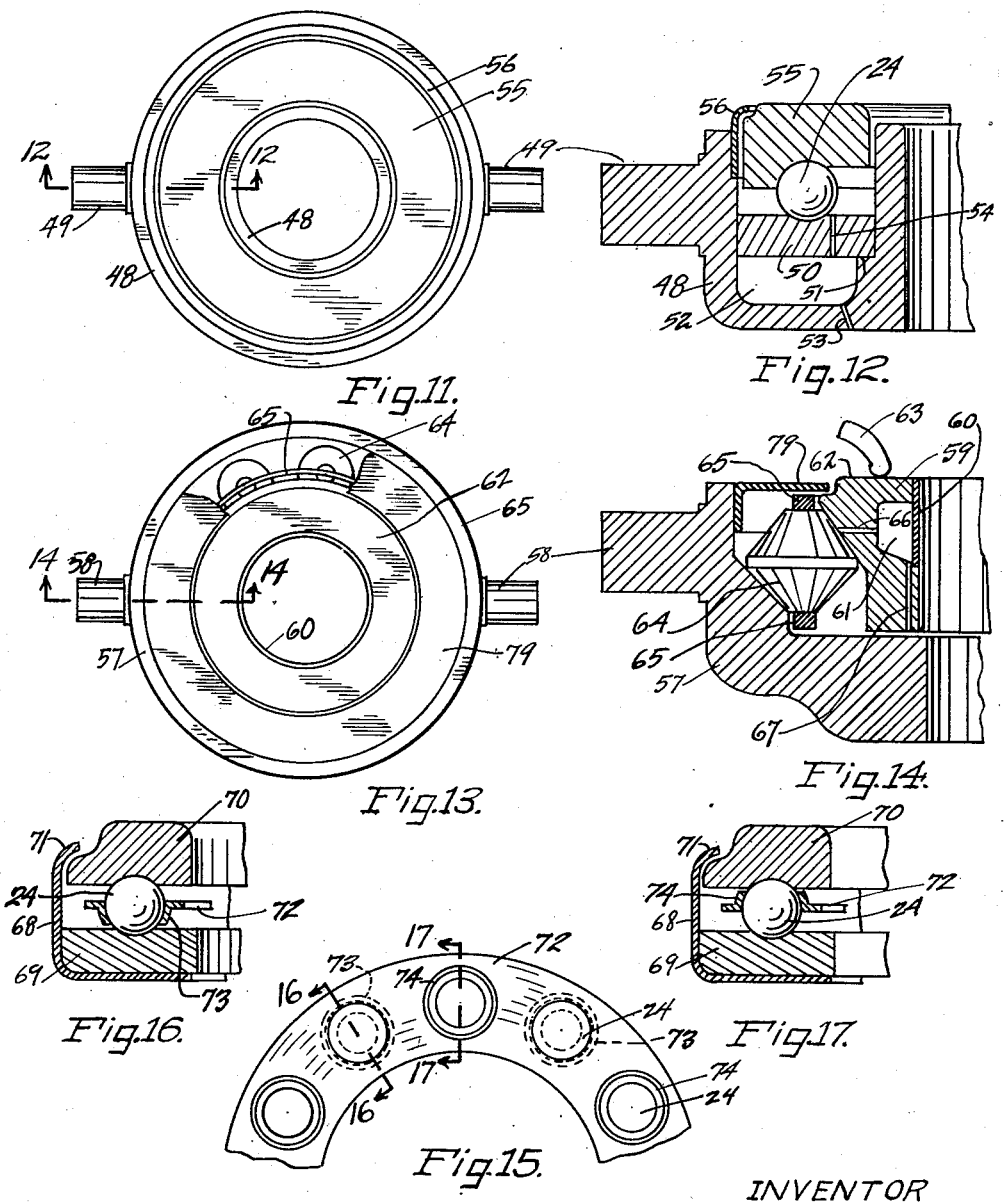
INVENTOR
Morris Katcher
BY Emanuel Scheyer
ATTORNEY Patented Oct. 3, 1944

2,359,364

UNITED STATES PATENT OFFICE 2,359,364

BEARING

Morris Katcher, New York, N. Y.

Application July 1, 1941, Serial No. 400,604

7 Claims. (Cl. 192—98)

This invention relates to thrust bearings and is especially adapted for clutch throwout bearings for automobiles or the like. In one form it comprises a complete bearing, having races, a shell about the races and rolling members such as balls between the races, said shell being held in a holder or container having trunnions extending therefrom, the trunnions being adapted for mounting in a forked lever. In the case of automobiles, the forked lever is operated by the clutch pedal or other operating means, while one of the races bears against the levers of the clutch which overcomes the spring pressure holding the clutch parts together. In another form the shell or housing about the races has the trunnions formed directly upon it, and in still another form the trunnions are directly on one of the races.

Other objects and advantages will become apparent upon further study of the description and drawings, in which:

Fig. 1 is a side elevation of the bearing where a holder is used over the bearing shell.

Fig. 2 is a front view of the bearing of Fig. 1, a portion only being shown of that part of the bearing held in the holder.

Fig. 3 is a partial section to an enlarged scale taken along the line 3—3 of Fig. 2.

Fig. 4 is a side elevation with a part in section of a housing shown by itself where the trunnions are directly formed thereon.

Fig. 5 is a front view of the housing of Fig. 4.

Fig. 6 is a partial section to an enlarged scale taken through the rim of a bearing having the housing of Figs. 4 and 5, said bearing having a modified form of retainer ring.

Fig. 7 is a partial elevation of the modified form of retainer ring shown holding ball bearings therein.

Fig. 8 is a side elevation with a part in section of a modified form of housing with the trunnions directly on the housing.

Fig. 9 is a front view of the housing of Fig. 8.

Fig. 10 is a partial section to an enlarged scale taken through the rim of a modified form of bearing having the housing of Figs. 8 and 9.

Fig. 11 is a front elevation of a bearing with a heavy metal housing with integral trunnions.

Fig. 12 is a partial section to an enlarged scale taken along the line 12—12 of Fig. 11.

Fig. 13 is a front elevation of a bearing in which one of the race rings has the trunnions directly upon it.

Fig. 14 is a partial section to an enlarged scale taken along the line 14—14 of Fig. 13.

Fig. 15 is a partial elevation of another form of retainer ring shown holding ball bearings therein.

Fig. 16 is a partial section of a bearing having the retainer ring of Fig. 15 and cutting through the latter along the line 16—16, and Fig. 17 is a partial section of a similar bearing to that of Fig. 16 but cutting through the retainer ring of Fig. 15 along the line 17—17.

The thrust bearing of Figs. 1, 2 and 3 comprises an annular shell or housing denoted in its entirety by the numeral 15, said housing having an inner wall 16, an end wall 17 and an outer wall 18. Race ring 19 is fixedly mounted inside of shell 15, said ring being L-shaped to provide with shell 15 a lubricant reservoir 21. Feed passages, such as the one shown at 46, lead from reservoir 21 to the space between the race rings. A vent passage 47 prevents reduced pressure in reservoir 21 as the lubricant escapes therefrom. Race ring 20 is loosely mounted in shell 15, its forward or radially extending face 22 being exposed for thrust into engagement with rotating parts as with clutch release levers (not shown), where the bearing is used as a clutch throw-out bearing for automobiles. Flange 23, formed on the outer wall 18 of the housing prevents race ring 20 from moving out of the housing. Balls 24 roll between race rings 19 and 20. Retainer ring 25 keeps balls 24 in spaced relation around the race rings. The rim of retainer ring 25 is Z-shaped in cross section in order to keep it in place axially between the race rings. Housing 15 is held in a container 26 which has an axially extending wall 27. The free end of wall 27 is curled over on itself at 28 providing a spring grip on housing 15 as the latter is forced into its position in container 26. Wall 27 of container 26 is provided with diametrally opposed tabs 29. These tabs, before being bent around to form trunnions 29, are shown by dotted lines in Fig. 1. A plug 30 is inserted in each trunnion 29.

The bearing of Figs. 4–6 has no container, the trunnions 31 being carried directly on the annular shell or housing 32. Except for the trunnions, shell 32 is the same as shell 15, and the bearing contained therein, except for the retainer ring 37 is also similar, race ring 19 being fixedly mounted in housing 32, while race ring 20 is loose therein, the same as in Fig. 3. The retainer ring 37 is composed of two coaxial rings 33 and 34 fastened together by tabs one of which is shown at 35. Each of rings 33 and 34 has a radially extending web portion from which extend axial projections 36. Whereas the retainer ring 25 of Fig. 3 can move axially between the race rings until its rounded corners touch them, retainer ring 37, Fig. 6 is substantially fixed against axial motion so that no rubbing, and consequent wear and scoring take place. The fixing is caused by the fact that the diameter of the holes in the axially spaced portions of the retainer ring where they engage the balls 24, is less than the diameter of the balls.

In the bearing of Figs. 8, 9 and 10, housing 38 has only an outer axially extending wall 39 and a radially extending wall 40. T-shaped race ring 41 is fixedly held in housing 38 providing a reservoir 42 from which lead small feed passages, such as shown at 43, to the space between the race rings. Balls 24 roll between race rings 41 and 44. Race ring 44 is free to rotate in housing 38, and as noted above for race ring 20 in Fig. 3, is adapted to be pressed against rotating parts such as clutch release levers (not shown). No retainer ring is used. Trunnions 45 are carried by wall 39. Certain features of the construction of the bearing of Figs. 8, 9 and 10 are similar to that shown in my pending application Serial No. 371,080, now Patent No. 2,274,419.

The bearing of Figs. 11 and 12 has a housing 48 of thick metal instead of the sheet metal of the previously described bearings, the trunnions 49 being formed integral with the housing. Fixed race ring 50 is set against shoulder 51 of housing 48. A reservoir 52 is formed between race ring 50 and said housing. One or more vent passages, one being shown at 53, is provided for reservoir 52. One or more feed passages, one being shown at 54, is provided to lead the lubricant placed in reservoir 52 to the space between race rings 50 and 55, the latter being the free race ring. Balls 24 roll between the race rings, no retainer ring being provided. In order to prevent race ring 55 from separating from the rest of the bearing a flanged shell 56 is forced inside the open end of housing 48.

The bearing of Figs. 13 and 14 is a tapered roller bearing in which the fixed race ring 57 has trunnions 58 thereon. Free race ring 59 is U-shaped providing with inner cylindrical shell 60 a reservoir 61. Radially extending face 62 of race ring 59 is adapted to engage with and be thrust against a rotating part, such as the clutch release lever 63. Tapered rollers 64 roll between race rings 57 and 59 and are held in spaced relation by retainer ring 65. Feed passages 66 lead from reservoir 61 to rollers 64. A vent passage 67 is also provided. Sheet metal shell 79, which has a forced fit inside of race ring 57, prevents race ring 59 from moving axially away from race ring 57.

The bearing of Figs. 15, 16 and 17 has a housing 68 in which is fixed a race ring 69. A free race ring 70 is retained in housing 68 by its flange 71. Balls 24 roll between said race rings being maintained in spaced relation by retainer ring 72. Cups 73 and 74 are provided on ring 72 at holes in its web, such cups extending in axially opposite directions from the web. Each cup has its inner surface of spherical curvature so that when a ball is placed in a cup it is held in the cup and prevented from passing completely through ring 72, since the diameter of the opening of the cup at its extreme axial distance from the web is less than the diameter of the hole in the web. Because the balls are prevented from passing through ring 72 from opposite directions, said ring is held against motion axially between race rings 69 and 70 and thus prevented from rubbing against them and scoring them.

In the forms of bearings shown in Figs. 1–12 and 15–17, one of the race rings is specified as a fixed race ring, said ring while preferably so, may be permitted to rotate in the housing, only being limited against axial motion relatively to the housing. If such rotation is present in bearings with a lubricant reservoir, the tightness of the lubricant reservoir is lessened.

I claim:

1. A throw-out bearing comprising a pair of race rings, members adapted to roll between said race rings in contact with each race ring, an annular shell fixedly mounted on one race ring and loosely attached to the other race ring, and an annular sheet metal container fastened to said shell and substantially enclosing the latter, said container being formed with diametrally opposed tabs extending radially therefrom bent into supports to act as trunnions.

2. A throw-out bearing comprising a pair of race rings, members adapted to roll between said race rings in contact with each race ring, an annular casing having the race rings and members mounted therein, said casing having an axially extending outer wall, a cup-shaped annular holder fitting over the casing, said holder having a resilient axially extending wall slidably fitting over said axial wall of the casing in a spring grip therewith, and radially extending trunnions on diametrally opposite sides of the axial wall of the holder.

3. A throw-out bearing comprising a pair of race rings, members adapted to roll between said race rings in contact with each race ring, an annular casing having the race rings and members mounted thereon, said casing having an axially extending outer wall, a cup shaped annular holder fitting over the casing, said holder having an axially extending wall extending over said axial wall of the casing, the axial wall of the holder having its free edge bent into a curl, resiliently gripping the axial wall of the casing, and radially extending trunnions on diametrally opposite sides of said latter wall.

4. A ring-shaped ball bearing for use in a thrust bearing with a thrust member, said ball bearing having a casing, race rings contained in the casing, said rings being provided with races for the balls to roll in on their radially extending faces, a holder containing said casing, the latter having a slidable removable fit in the holder and means on diametrally opposite sides of the holder for pivotally engaging the thrust member.

5. A throw-out bearing operated by a thrust member, comprising a pair of race rings, members adapted to roll between said race rings in races provided therein on their radially extending faces, an annular casing having the race rings and members mounted therein, said casing having an axially extending outer wall, a cup-shaped annular holder fitting over the casing, said holder having an axially extending wall slidably and removably fitting over said axial wall of the casing in a spring grip therewith, and means on diametrally opposite sides of the axial wall of the holder for pivotally engaging the thrust member.

6. A throw-out bearing comprising a pair of race rings, members adapted to roll between said race rings in contact with each race ring, an annular housing fixedly mounted on one race ring and loosely attached to the other race ring.

an annular container substantially encircling the housing, said container having a resilient wall resiliently gripping the housing and slidably mounted thereon, and diametrally opposed trunnions extending radially outward from the container.

7. A throw-out bearing comprising a ring-shaped ball bearing having a casing containing the races, a resilient holder removably and resiliently attached to said casing, and radially extending trunnions on diametrally opposite sides of the holder.

MORRIS KATCHER.